United States Patent [19]

Iwagoe et al.

[11] Patent Number: 5,604,615
[45] Date of Patent: Feb. 18, 1997

[54] LIQUID CRYSTAL DISPLAY DEVICE AND METHODS FOR PRODUCING SAME WITH ALIGNMENT LAYER HAVING NEW BOND FORMATION OR BOND CLEAVAGE REACTION OF MOLECULAR CHAINS BY LIGHT IRRADIATION

[75] Inventors: Hiroko Iwagoe, Yamatokoriyama; Shigeaki Mizushima, Ikoma, both of Japan

[73] Assignee: Sharp Kabushiki Kaisha, Osaka, Japan

[21] Appl. No.: 447,040

[22] Filed: May 22, 1995

[30] Foreign Application Priority Data

May 27, 1994 [JP] Japan ................................. 6-115151

[51] Int. Cl.⁶ ................................................ G02F 1/1337
[52] U.S. Cl. ..................................... 349/124; 349/136
[58] Field of Search ............................. 359/75, 76, 77

[56] References Cited

U.S. PATENT DOCUMENTS

| | | | |
|---|---|---|---|
| 5,128,788 | 7/1992 | Takatoh et al. | 359/75 |
| 5,464,669 | 11/1995 | Kang et al. | 359/76 |

FOREIGN PATENT DOCUMENTS

| | | |
|---|---|---|
| A-0525478 | 2/1993 | European Pat. Off. . |
| A-0613037 | 8/1994 | European Pat. Off. . |
| 60-60624 | 4/1985 | Japan ................................. 359/76 |
| 60-217339 | 10/1985 | Japan ................................. 359/76 |
| 1-210932 | 8/1989 | Japan ................................. 359/76 |
| A-02-055330 | 2/1990 | Japan . |
| 2-55330 | 2/1990 | Japan ................................. 359/76 |
| 4-350822 | 12/1992 | Japan . |
| A-05-034669 | 2/1993 | Japan . |
| 5-34699 | 2/1993 | Japan . |
| 5-53513 | 3/1993 | Japan . |
| 5-134247 | 5/1993 | Japan . |
| 5-173135 | 7/1993 | Japan . |
| 5-341290 | 12/1993 | Japan ................................. 359/76 |

Primary Examiner—William L. Sikes
Assistant Examiner—James A. Dudek
Attorney, Agent, or Firm—Nixon & Vanderhye P.C.

[57] ABSTRACT

A liquid crystal display device includes: a pair of substrates; a pair of electrodes formed on the pair of substrates; a pair of alignment films formed on the pair of electrodes; and a liquid crystal layer sandwiched between the pair of alignment films, wherein at least one of the alignment films have a property of aligning liquid crystal molecules of the liquid crystal layer with a pretilt angle, the property being provided by a new bond formation reaction or bond cleavage reaction of molecular chains caused by irradiating the at least one alignment film with light.

12 Claims, 14 Drawing Sheets

FIG. 2
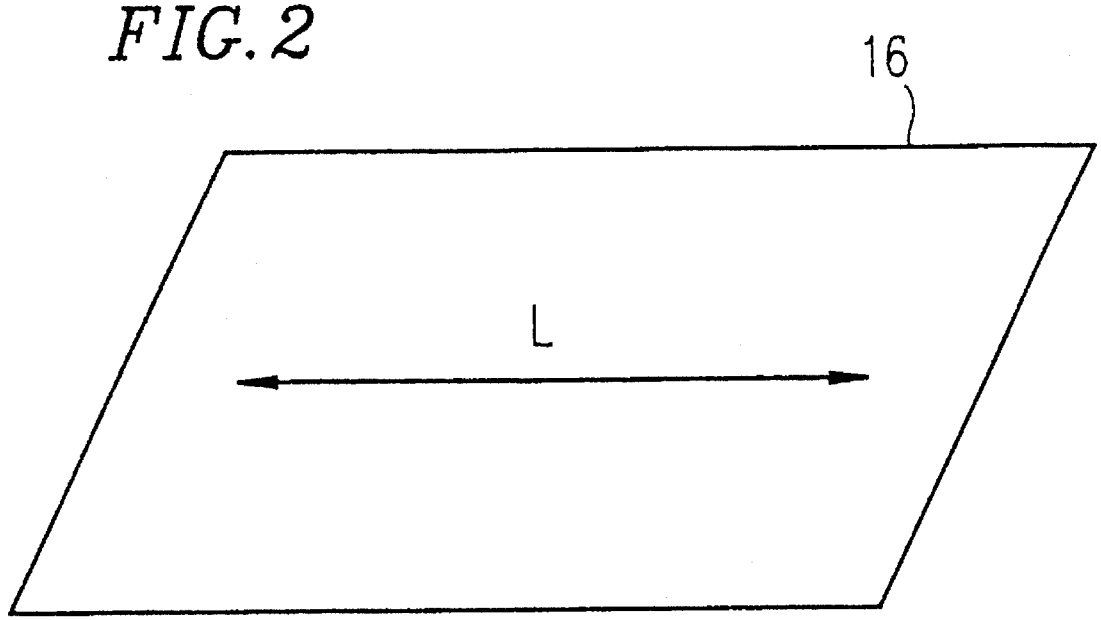
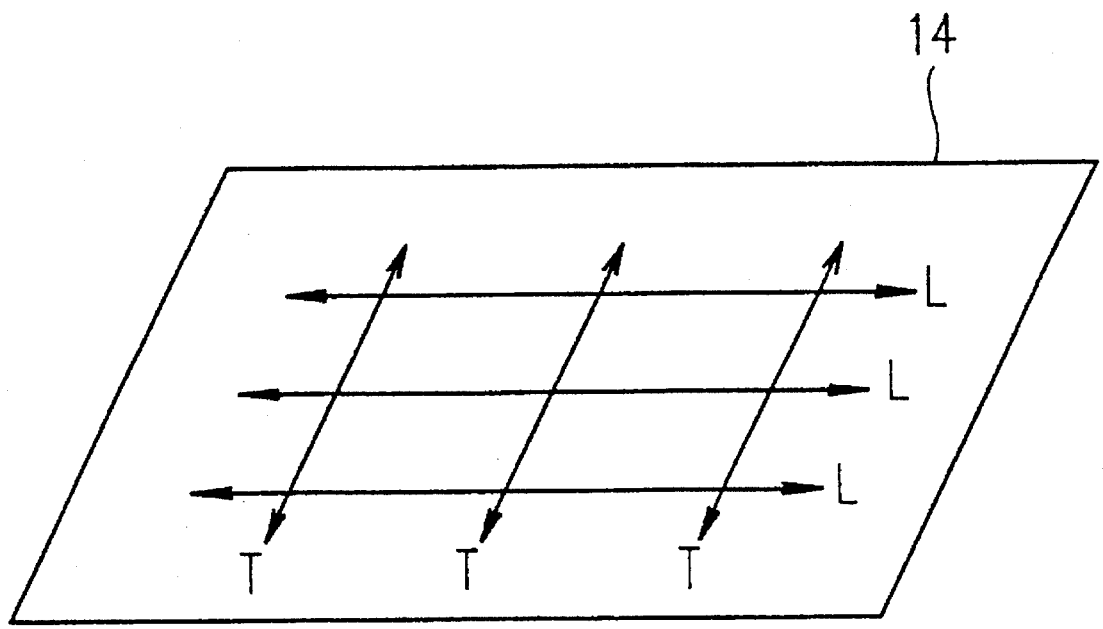

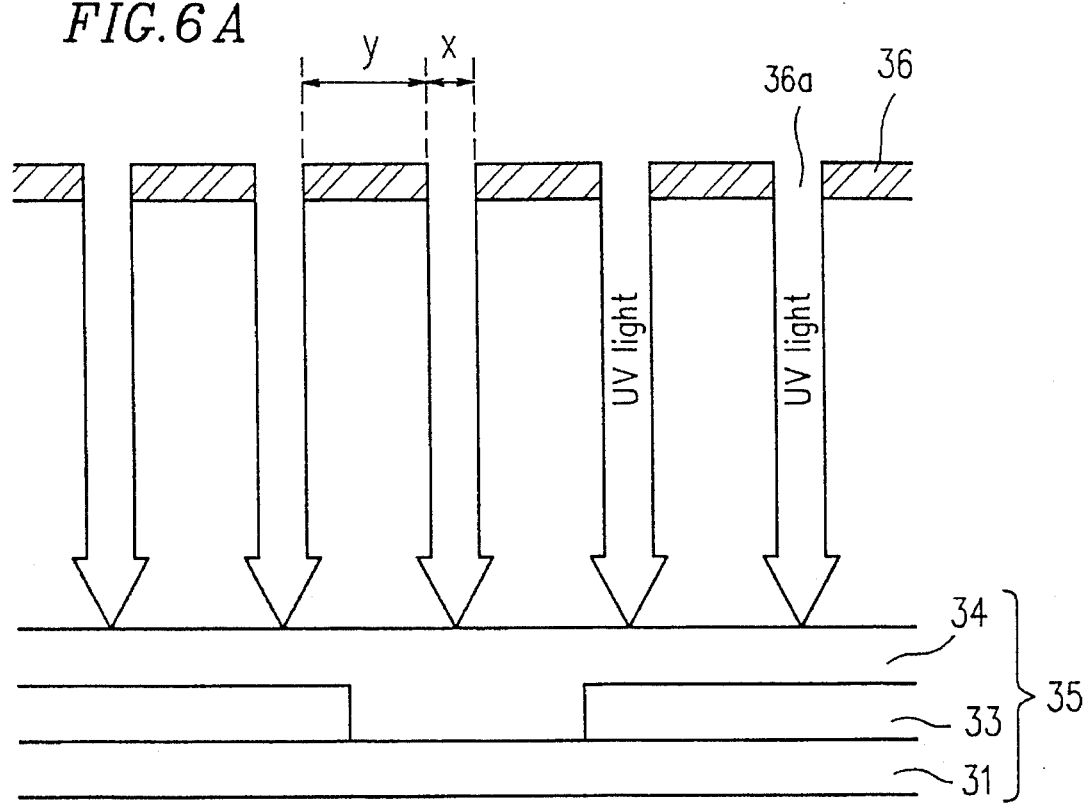
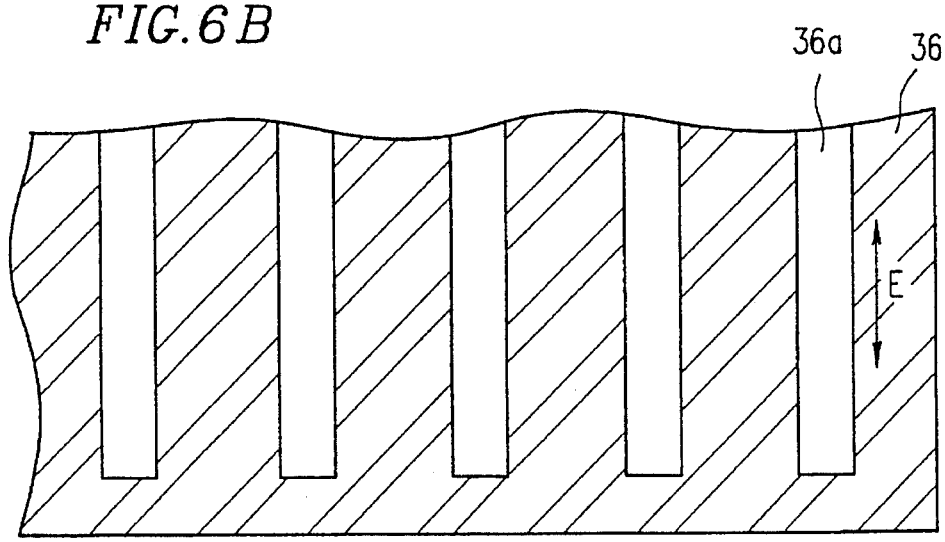

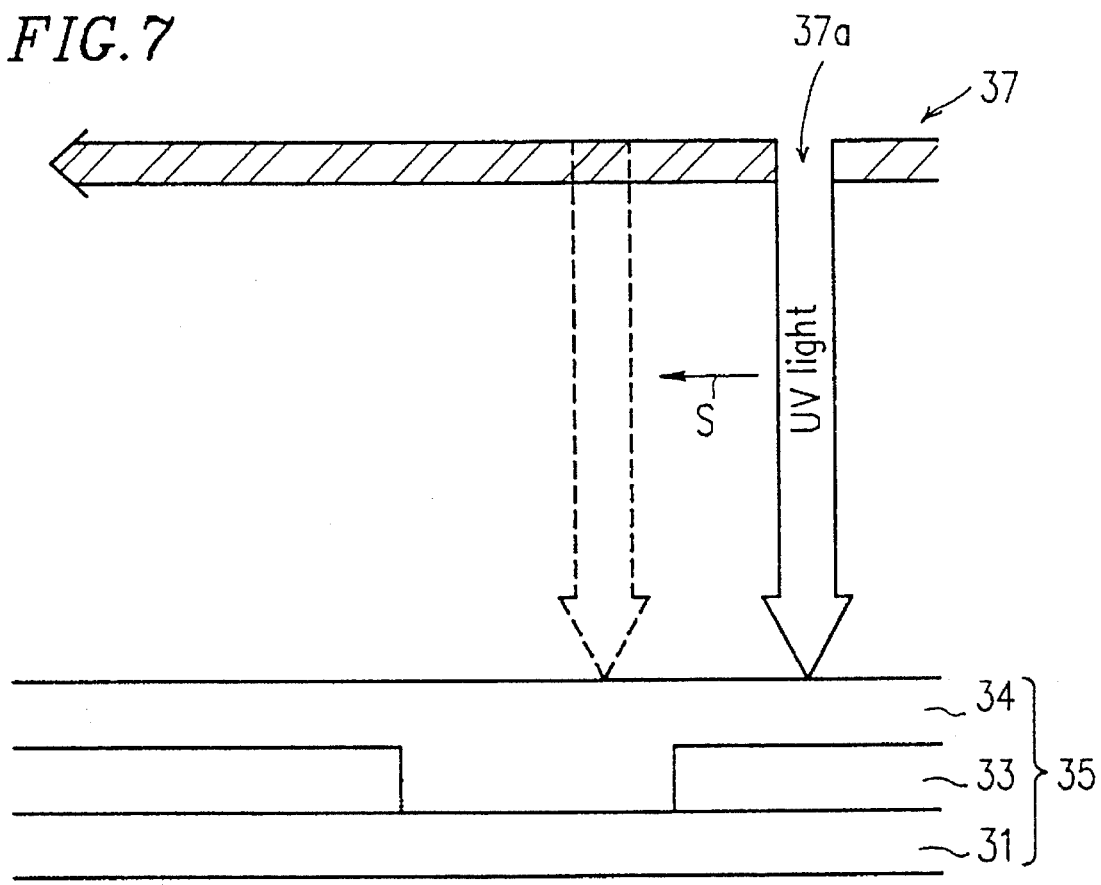

LIQUID CRYSTAL DISPLAY DEVICE AND METHODS FOR PRODUCING SAME WITH ALIGNMENT LAYER HAVING NEW BOND FORMATION OR BOND CLEAVAGE REACTION OF MOLECULAR CHAINS BY LIGHT IRRADIATION

BACKGROUND OF THE INVENTION

1. Field of the Invention

The present invention relates to a liquid crystal display device. In particular, the present invention relates to a liquid crystal display device with an excellent viewing angle, a method for producing such a device, and an apparatus for producing such a device.

2. Description of the Related Art

Conventionally, a liquid crystal display device (hereinafter referred to as "LCD") includes liquid crystal molecules in a liquid crystal layer interposed between a pair of substrates. When the alignment of the liquid crystal molecules is changed, the optical refractive index of a liquid crystal layer is also changed. By utilizing the change in the refractive index, the LCD performs the display. Accordingly, it is important to control the alignment of the liquid crystal molecules in the liquid crystal layer. The liquid crystal molecules are specifically arranged by the interactions between the surfaces of the substrates sandwiching the liquid crystal layer and the liquid crystal molecules.

In the method which is currently the most widely used for aligning liquid crystal molecules in a certain direction: an alignment film is formed on each of the surfaces of the substrates which face the liquid crystal layer; then the surfaces of the alignment films are rubbed.

For example, a polyimide film formed on the substrate is subjected to a rubbing treatment in order to align the liquid crystal molecules along the rubbing direction. Since the conventional rubbing treatment is unidirectionally performed, the liquid crystal molecules in the vicinity of the surface are unidirectionally aligned. Therefore, a viewing direction of the liquid crystal display device is defined by the orientation of the liquid crystal molecules in the liquid crystal layer, that is, the rubbing direction.

The liquid crystal display device produced by such a rubbing method has problems in viewing angle characteristics because the liquid crystal molecules in the center portion in a thickness direction of the liquid crystal layer are unidirectionally aligned. In such a case, the following disadvantageous problems occur.

In a liquid crystal display device using a thin film transistor (TFT-LCD), a structure called Twisted Nematic (hereinafter, referred to as "TN") mode is adopted. FIGS. 10 and 11 are a perspective view showing a schematic structure of a conventional liquid crystal display device and a cross-sectional view thereof. In FIGS. 10 and 11, a positive viewing direction 1 is a major axis direction of liquid crystal molecules 2 in the vicinity of the central portion of the liquid crystal layer, that is, a direction in which the major axis direction of the liquid crystal molecules is orientated when the liquid crystal molecules rise. An angle δ indicates a pretilt angle of the liquid crystal molecules 2. Moreover, a rubbing direction 5 of a substrate 3 and a rubbing direction 6 of a substrate 4 are perpendicular to each other so that the liquid crystal molecules 2 are twisted at 90° between the pair of the substrates 3 and 4. A transparent electrode 3b and an alignment film 3c are formed on the glass substrate 3a, thereby constituting the substrate 3. A transparent electrode 4b and an alignment film 4c are formed on the glass substrate 4a, thereby constituting the substrate 4.

In a normally white (hereinafter referred to as "NW") mode in which the liquid crystal display device transmits light therethrough (i.e., displays white) when the voltage is not applied. Voltage-transmittance (V-T) characteristics are shown in FIG. 12. As indicated with a solid line L1 in FIG. 12, when the liquid crystal display device is viewed from the normal to the substrate, the light transmittance decreases as the applied voltage increases.

When the viewing angle is inclined in the positive viewing direction from the normal to the substrate of liquid crystal display device, the V-T characteristic is as indicated with a solid line L2 in FIG. 12. There is a voltage region where the transmittance increases as the applied voltage increases. In this voltage region, an inversion of gray-scale, that is, an inversion of black and white occurs. This phenomenon is caused by the change in the apparent refractive indices due to the viewing angle. In the NW mode, the darkest display is obtained when the liquid crystal display is viewed along a direction perpendicular to the substrate while the major axes of the liquid crystal molecules are aligned parallel to the viewing angle and in a direction perpendicular to the substrate. The liquid crystal molecules are inclined (tilted) in accordance with each voltage corresponding to each gray-scale. When the viewing angle is inclined from the direction perpendicular to the substrate, the viewing direction deviates from the major axis direction of the liquid crystal molecules in the region displaying black (i.e., aligned in the direction perpendicular to the substrate), to become parallel to the major axis direction of the inclined liquid crystal molecules of the region displaying half-tone. As a result, the half-tone displaying region looks darker than the region displaying black.

As shown in FIG. 13A, when the voltage applied across the transparent substrates 3 and 4 is zero or a relatively low voltage, the center molecule 2 of the liquid crystal layer is observed as an ellipse by a viewer 7 positioned in the positive viewing direction 1. As the applied voltage is gradually increased, the center molecule 2 rises to be parallel to the electric field direction. Accordingly, as shown in FIG. 13B, the center molecule 2 at a certain voltage is observed as a circle by the viewer 7. As the applied voltage is further increased, the liquid crystal molecule 2 becomes substantially parallel to the electric field direction. As a result, the liquid crystal molecule 2 is observed again as ellipse by the viewer 7, as shown in FIG. 13C.

Similarly, in the viewing directions other than the positive viewing direction 1, V-T characteristics vary depending on the viewing directions. In the directions other than the positive direction, the inversion phenomenon does not occur since the viewing directions do not agree to the major axis direction of the liquid crystal molecules. However, there is a problem that the contrast ratio is lowered as the viewing angle is inclined, as indicated with a solid line L3 of FIG. 12. The above-mentioned problems such as gray-scale inversion and unevenness of the viewing angle characteristics always occur not only in the TN mode LCD but also in a display device which has one orientation state over the entire display panel and conducts display by utilizing birefringence of the liquid crystal molecules.

A technique for obtaining a TN mode LCD with improved viewing angle characteristics is disclosed in Japanese Laid-Open Patent Publication No. 5-173135. According to the technique, the surface of the alignment film is unidirectionally rubbed, and then a resist is applied on a part of the alignment film. Then, the rubbing treatment is performed in the direction reverse to the previous rubbing direction. As a result, the alignment film is provided with different alignment conditions caused by the different rubbing directions between the alignment film surface covered with the resist and the alignment film surface not covered with the resist, so as to provide the liquid crystal cell with opposite viewing directions.

However, if the conventional method for rubbing the surface of the alignment film a plurality of times is used, each of the upper and lower substrates should be subjected to a rubbing treatment twice, a resist application treatment and a resist removing treatment, in order to provide the liquid crystal molecules in one pixel with two orientation directions. In the case where the alignment film is divided into the larger number of regions in order to improve the viewing characteristics, the number of rubbing treatments and the number of other treatments are further increased.

In this way, if the rubbing method is used as a means for adding a plurality of alignment directions to one pixel, there are problems such as a complicated fabrication process, and contamination and deficiency of the alignment film caused in the photolithography process. Therefore, this method is not suitable for mass production.

SUMMARY OF THE INVENTION

A liquid crystal display device of the present invention includes:

a pair of substrates;

a pair of electrodes formed on the pair of substrates;

a pair of alignment films formed on the pair of electrodes; and a liquid crystal layer sandwiched between the pair of alignment films, wherein at least one of the alignment films have a property of aligning liquid crystal molecules of the liquid crystal layer with a pretilt angle, the property is provided by a new bond formation reaction or bond cleavage reaction of molecular chains caused by irradiating the at least one alignment film with light.

In one embodiment of the invention, the at least one alignment film is treated such that the liquid crystal molecules align with a pretilt angle by irradiation with at least one of a polarized light beam, a light beam passing through at least one slit, and a unidirectionally scanning laser beam.

According to another aspect of the invention, a method for producing a liquid crystal display device of the invention including:

a pair of substrates;

a pair of electrodes formed on the pair of substrates;

a pair of alignment films formed on the pair of electrodes; and a liquid crystal layer sandwiched between the pair of alignment films, includes a step of:

irradiating at least one of the pair of alignment films with a light beam to cause a new bond formation reaction or bond cleavage reaction of molecular chains of at least one of the pair of the alignment films such that the at least one alignment film has a property to align liquid crystal molecules of the liquid crystal layer with a pretilt angle.

In one embodiment of the invention, the light beam with which the at least one of the pair of the alignment film is irradiated is least one of a polarized light beam, a light beam passing through at least one slit, and a unidirectionally scanning laser light beam.

In another embodiment of the invention, at least one of the pair of the alignment film is irradiated with a collimated light beam in a direction inclined with respect to a normal to the at least one of the pair of the alignment film.

In still another embodiment of the invention, the light beam with which the at least one of the pair of the alignment film is irradiated is at least one of a ultraviolet ray, a visible ray and an infrared ray.

Alternatively, a liquid crystal display device of the invention includes:

a pair of substrates;

a pair of electrodes formed on the pair of substrates;

a pair of alignment films formed on the pair of electrodes; and a liquid crystal layer sandwiched between the pair of alignment films, wherein a plurality of regions of at least one of the alignment films have a property of aligning liquid crystal molecules of the liquid crystal layer with a pretilt angle, the property being provided by a new bond formation reaction or bond cleavage reaction of molecular chains caused by irradiating the at least one alignment film with a light beam, the liquid crystal layer having a plurality of regions in which liquid crystal molecules of the liquid crystal layer align in a direction, and where the liquid crystal molecules in each of the plurality of regions align in a different direction.

In one embodiment of the invention, each of the plurality of the regions of the at least one alignment film is treated such that the liquid crystal molecules align with a pretilt angle, by irradiation with at least one of a polarized light beam having a different polarization direction for each of the plurality of the regions, a light beam passing through at least one slit arranged in a different direction for each of the plurality of the regions, and a unidirectionally scanning laser beam in a different direction for each of the plurality of the regions.

Alternatively, a method for producing a liquid crystal display device of the invention including:

a pair of substrates;

a pair of electrodes formed on the pair of substrates;

a pair of alignment films formed on the pair of electrodes; and a liquid crystal layer sandwiched between the pair of alignment films, includes a step of:

irradiating a plurality of regions of at least one of the pair of alignment films with a light beam such that the liquid crystal layer has a plurality of regions and liquid crystal molecules in each of the regions align in a different direction.

In one embodiment of the invention, the light beam with which the at least one of the pair of the alignment films is irradiated with at least one of a polarized light beam having a different polarization direction for each of the plurality of the regions, a light beam passing through at least one slit arranged in a different direction for each of the plurality of the regions, and a unidirectionally scanning laser beam in a different direction for each of the plurality of the regions.

In another embodiment of the invention, at least one of the pair of the alignment film is irradiated with a collimated light beam in a direction inclined with respect to a normal to the at least one of the pair of the alignment film.

In still another embodiment of the invention, the light beam with which the at least one of the pair of the alignment film is irradiated is at least one of a ultraviolet ray, a visible ray and an infrared ray.

According to another aspect of the present invention, an apparatus for producing a liquid crystal display device of the invention includes:

a light source; and directionality providing means for providing an alignment film with a property to align liquid crystal molecules with a pretilt angle by causing a new bond formation reaction or bond cleavage reaction of molecular chains by a light energy from the light source.

In one embodiment of the invention, the directionality providing means radiates light to the alignment film through a polarizing filter having a plurality of polarization directions or a photomask having a slit having at least one direction.

In another embodiment of the invention, the light source is a laser beam source, and the directionality providing means is scanning means for scanning a laser beam from the laser beam source on the alignment film in an arbitrary direction.

In still another embodiment of the invention, an apparatus for fabricating a liquid crystal display device further includes:

a holding member for holding a substrate portion having the alignment film;

a collimation means for collimating a light beam from the light source; and at least one of means for inclining the holding means with the substrate portion with respect to a irradiation direction of the collimated light beam and inclining the light source with respect to a normal to the alignment film.

In still another embodiment of the invention, the light source radiates at least one of a ultra-violet ray, a visible ray and an infrared ray.

With the above structure, since it is possible to align liquid crystal molecules of an arbitrary region of the display screen of a liquid crystal display device in an arbitrary direction, the viewing angle characteristics may be improved. It is possible to provide each region with a different alignment direction, that is, a different viewing direction, by using the following methods: a method for irradiating an alignment film with light through a polarizing filter having a different polarization direction in each of the plurality of regions in its plane; a method for irradiating an alignment film with light through a slit having a different direction in each region; and a method for scanning a laser beam on an alignment film in a different direction in each region. For example, a pixel is divided into two regions, which are treated so as to have a positive viewing direction and a negative viewing direction, respectively. The characteristic of the positive viewing direction (the solid line L2 in FIG. 12) and the characteristic of the negative viewing direction (the solid line L3 in FIG. 12) are mixed to show the characteristic indicated with the solid line L4 in FIG. 12. The inversion phenomenon in the positive viewing direction and the lowering of the contrast in the negative viewing direction are alleviated, whereby the display quality is improved. The pixel is divided into, for example, four regions and each of the four divided regions has a viewing direction different from a viewing direction of another region by 90°. It is possible to homogenize the viewing angle characteristics in the four directions. Furthermore, it is possible to divide the pixel into a larger number of regions so as to homogenize the viewing angle characteristic over almost all directions. The uniformness of the viewing angle characteristics can be realized merely by changing the polarization direction of the light, the orientation of the slit, and the scanning direction of the laser beam in each region. Therefore, the number of the viewing directions to be obtained is not limited. Moreover, even if the number of the viewing directions increases, the number of processes, through-put, cost and the like scarcely increase.

Since the molecular chains of a polymer constituting an alignment film are treated so as to be aligned in a plurality of directions by light irradiation, an alignment treatment can be conducted without using a conventional rubbing method.

As a method for aligning liquid crystal molecules with a pretilt angle, a method for; irradiating an alignment film with polarized light; irradiating an alignment film with light through a slit plate, for example, a photomask provided with a slit; and irradiating an alignment film with a scanning laser beam, and the like are applicable. When the alignment film consisting of polymer molecules are irradiated with light having a high energy, the molecular structures of the polymer molecules may change due to the break of chemical bonds or the formation of new chemical bonds caused by absorbing the light. If an alignment film made of a polymer material having chemical bonds in random directions is irradiated with polarized light, which is different from the normal unpolarized light, only chemical bonds in a direction parallel to the polarization direction absorb the light and are broken. On the other hand, since the chemical bonds in a direction perpendicular to the polarization direction of the light do not absorb light, chemical change does not occur for their chemical bonds. By such a selective reaction, the molecular structures of the alignment film have directionality in a direction perpendicular to the polarization direction of the light. On the contrary, if the unpolymerized alignment film is irradiated with the polarized light, chemical bonds are selectively formed. As a result, the alignment film in which molecular structures have directionality in a direction parallel to the polarization direction of the light is obtained.

If the alignment film is irradiated with light through a plurality of slits, for example, in the striped manner, chemical bonds in the region irradiated with light are broken to change the molecular structures. Thus, the molecular chains are aligned in a direction parallel to the slits (the extending lengthwise direction of the slit). In another example of a method using the slits, the slits are moved little by little during the light irradiation. Since the electrons excited by light irradiation generate bonds with the adjacent region which is not irradiated with light; when the electrons relax from the excited state to the ground state, molecular structures aligned in the direction perpendicular to the extending direction of the slits (the direction parallel to the moving direction of the slits) are formed by moving the slits in a direction perpendicular to the extending direction of the slits.

A method for scanning a laser beam on the alignment film may be effected using the same principle. If a laser beam is scanned on the surface of the alignment film, for example, in a striped manner, only the chemical bonds in the region irradiated with a laser light may be broken so as to provide directionality to the molecular chains.

In these methods, for providing liquid crystal molecules with a tilt angle, the surface of the alignment film is irradiated with a collimated light beam at an angle. This light irradiation can be achieved by; for example, inclining a holding member such as a stage for holding a substrate, or placing a light source at an angle.

Since a non-contact alignment treatment may be performed by these methods, problems of dust or static electricity in the rubbing method may be solved, thereby improving a yield of acceptable products. In the rubbing process, a cleaning process after the rubbing treatment which was indispensable to the conventional method, may be omitted. Therefore, the whole process may be simplified and the cost can be reduced.

Thus, the invention described herein makes possible the advantages of: (1) providing a liquid crystal display device which has improved viewing angle characteristics and is capable of solving the problems such as complication of the fabrication process and contamination and deficiency of the alignment film; (2) providing a method for producing such a liquid crystal display device; and (3) providing an apparatus for producing such a liquid crystal display device.

These and other advantages of the present invention will become apparent to those skilled in the art upon reading and understanding the following detailed description with reference to the accompanying figures.

BRIEF DESCRIPTION OF THE DRAWINGS

FIG. 2 is a schematic view showing a polarization direction of a polarizing filter 16 of FIG. 1 and orientation directions of an alignment film 14.

FIG. 6A is a cross-sectional view showing an apparatus and a substrate portion, which schematically illustrates a light irradiation process in Example 2 of the present invention; and FIG. 6B is a plan view showing a slit plate used in Example 2 of the present invention.

FIG. 7 is a cross-sectional view showing an apparatus and a substrate portion, schematically illustrating another example of a light irradiation process in Example 2 of the present invention.

DESCRIPTION OF THE PREFERRED EMBODIMENTS

Figure 1:
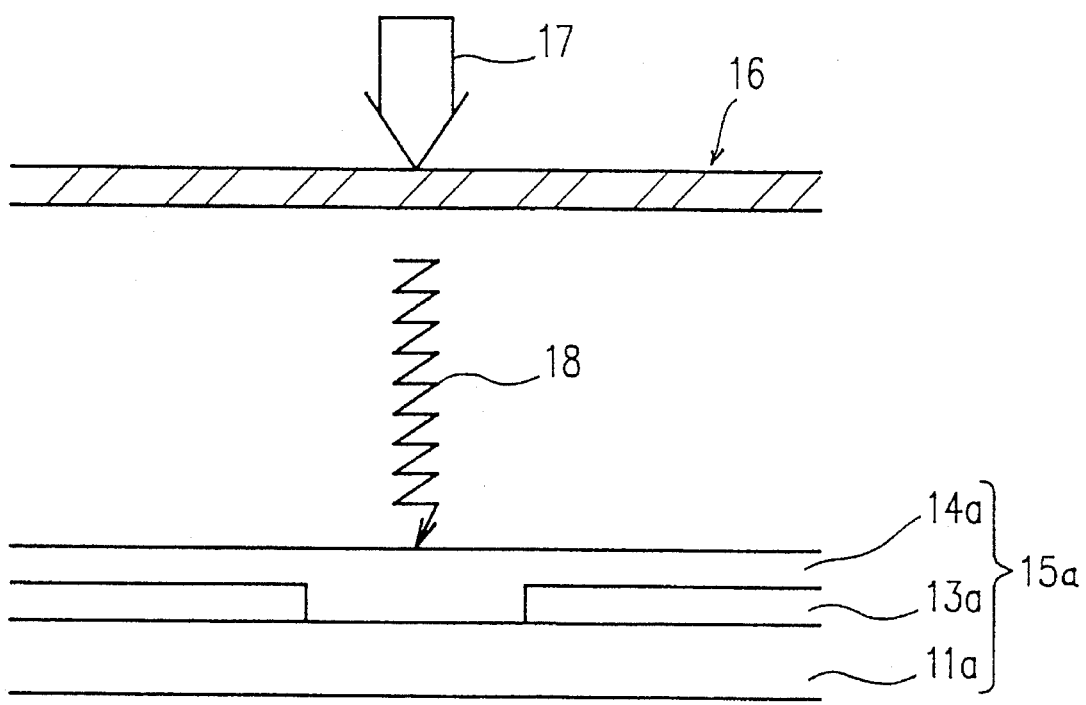
FIG. 1 is a cross-sectional view of an apparatus and a substrate portion, illustrating a fabrication process of a liquid crystal display device according to Example 1 of the present invention.

Hereinafter, examples of the present invention will be described by way of illustrative examples. Note that corresponding elements in different figures will be identified with the same reference numerals.

Example 1

Figure 14A:
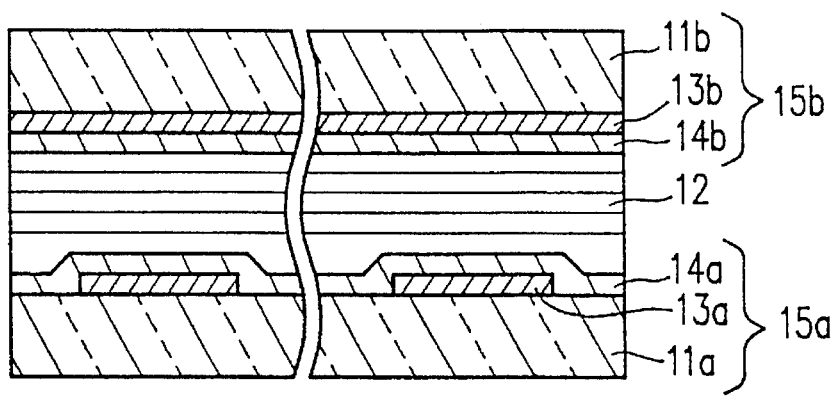
FIG. 14A is a cross-sectional view of a liquid crystal display device of the present invention.

FIG. 14A is a cross-sectional view of a liquid crystal display of the present invention. A liquid crystal layer 12 is interposed between two substrate potions 15a and 15b. The substrate potions 15a and 15b respectively include: transparent (e.g., glass) substrates 11a and 11b; a pixel electrode 13a and a opposite electrode 13b formed on the respective transparent substrates 11a and 11b; and alignment films 14a and 14b formed over the pixel electrode 13a and the opposite electrode 13b respectively. The liquid crystal layer 12 has a twist orientation of 90 degrees.

Figure 14B:
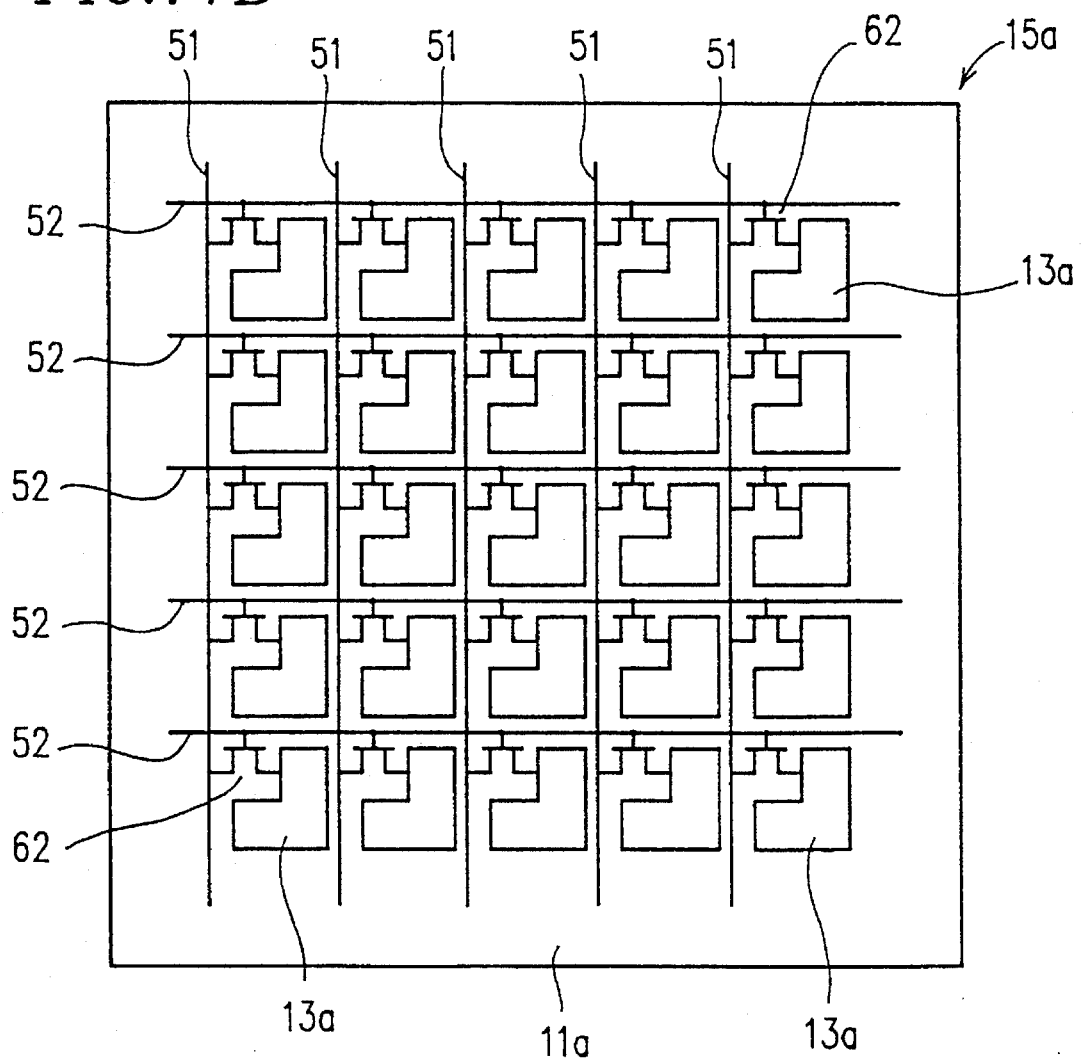
FIG. 14B is a plan view of a substrate portion of a liquid crystal display device according to the invention.

The liquid crystal display device (LCD) of this example is an active matrix type LCD. As shown in FIG. 14B, thin film transistors (TFTs) 62, source bus lines 51 and gate bus lines 52, which are connected to respective sources and gates of the TFTs 62; are formed on the substrate portion 15a. The pixel electrodes 13a are connected to drains of the TFTs 62. The alignment film material is applied to cover the pixel electrodes 13a, the TFTs 62, bus lines 51 and 52, and is baked so as to obtain the complete alignment film 14a (not shown in FIG. 14B).

FIG. 1 is a cross-sectional view showing the fabrication process of the substrate portions 15a and 15b of the LCD as shown in FIGS. 14A and 14B.

The fabrication method will be described for the substrate 15a as an example. A polarizing filter 16 described below is placed so as to face the alignment film 14a of the substrate portion 15a.

First, the electrodes 13a, TFTs 62, and the wirings 51 and 52 are formed on the substrate 11a. Next, the alignment film 14a is formed on the entire surface of the substrate 11a so as to cover all the above-mentioned elements. In Example 1, a polyimide film, which is a kind of organic polymer film, is used as the alignment film 14a. In this way, after forming the alignment film 14a, the alignment film 14a is irradiated with light 17 through the polarizing filter 16. At this time, while the light 17 originally oscillates in all directions, the light passing through the polarizing filter 16 becomes linearly polarized light 18 which oscillates unidirectionally. The chemical structure and the like of the alignment film 14a in the irradiated region is selectively changed by the irradiation of the light having oscillation only in a fixed direction with a predetermined amount of energy or more.

In Example 1, the polarizing filter 16 having a polarizing axis in a direction L of FIG. 2 is used. As the light 17, any one or any combination thereof an ultra-violet ray, a visible ray or an infrared ray may be used. As a light ray having high energy, an ultra-violet (UV) ray having a wavelength in the range of 300 nm or less is the most preferable. Such a UV ray is effectively obtained with a mercury-xenon lamp, a low-pressure mercury lamp, or the like. If such an ultra-violet ray is used, it is necessary to irradiate the alignment film with the ultra-violet ray of 1 J/cm$^2$ or more at the amount of light which is obtained after the ultra-violet ray passes through the polarizing filter 16. The irradiation process of the light 17 is carried out at an arbitrary point of time after the alignment film material is applied thereon. It is possible to form aligned molecular structures by irradiating the alignment film 14a with the polarized light before polymer chains are formed. Alternatively, it is possible to provide a directionality to the molecular orientations of the alignment film by irradiating the alignment film with the polarized light to selectively break the bond in a certain direction after the polymer chains are formed. As mentioned above, only electrons which absorb the light energy of the polarized light 18 are excited enough to generate bonds so as to form molecular structures having an orientation in the direction L parallel to the polarization direction of the polarized light. As a result, the liquid crystal molecules are selectively aligned to the polarization direction. If the alignment film is irradiated with the polarized light 18 after the polymer chains are formed, only the bonds which absorb the light energy of the polarized light 18 are broken among bonds present in random directions. The molecular structures having the orientation in a direction T perpendicular to the polarized light 18 is formed. As a result, the liquid crystal molecules are aligned perpendicular to the polarization direction.

In this way, the liquid crystal molecules are aligned. It is possible to provide an arbitrary pretilt angle to the liquid crystal molecules by irradiating collimated polarized light 18 at an angle. In order to obtain the collimated light, a light source having a well-known collimation optical system may be used. As a method for irradiating an alignment film with the polarized light 18 at an angle, the following methods are applicable: a method for irradiating the substrate portion 15a with the polarized light 18 through the polarizing filter 16, while the light source 19 itself is placed at an angle with respect to the substrate portion 15a as shown in FIG. 3; a method for inclining a stage 20 for holding the substrate portion 15a as shown in FIG. 4; and a method shown in FIG. 5 for irradiating the substrate portion 15a with the polarized light 18 so as to allow the light to pass through the polarizing filter 16 serving as a polarizer after inclining the optical axis with respect to the substrate portion 15a by using a mirror 21.

Figure 3:
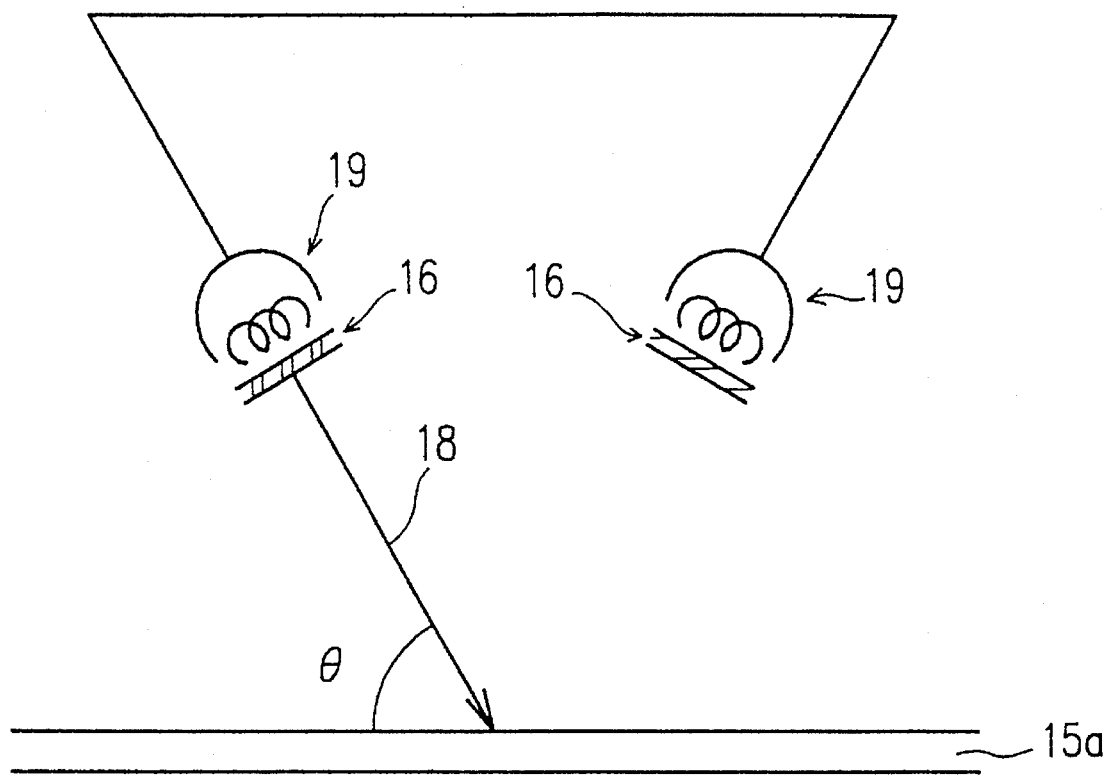
FIG. 3 is a schematic view illustrating the arrangement of an apparatus and a substrate portion, which shows a first method for irradiating light with a light source being inclined during a light irradiation process according to Example 1.
Figure 4:
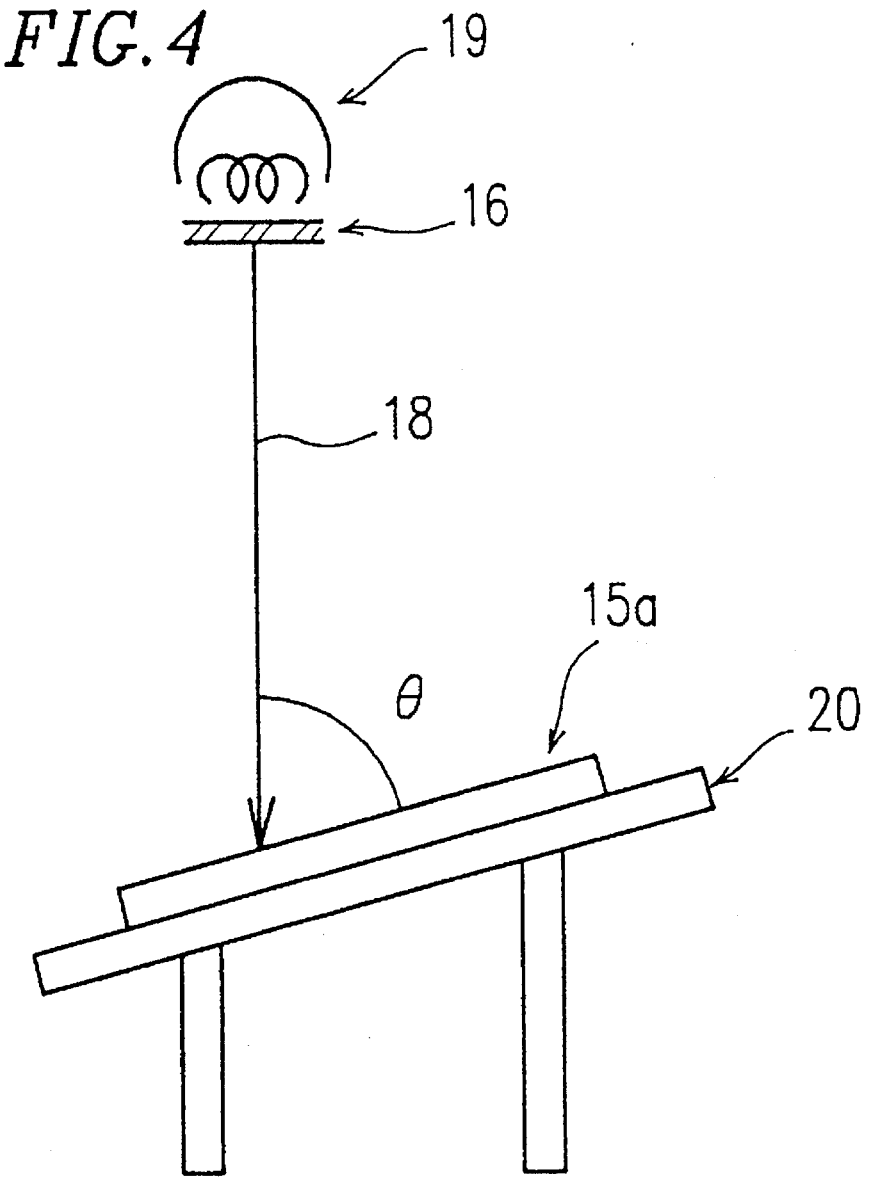
FIG. 4 is a schematic view illustrating the arrangement of an apparatus and a substrate portion, which shows a second method for irradiating light with a light source being inclined during a light irradiation process according to Example 1.
Figure 5:
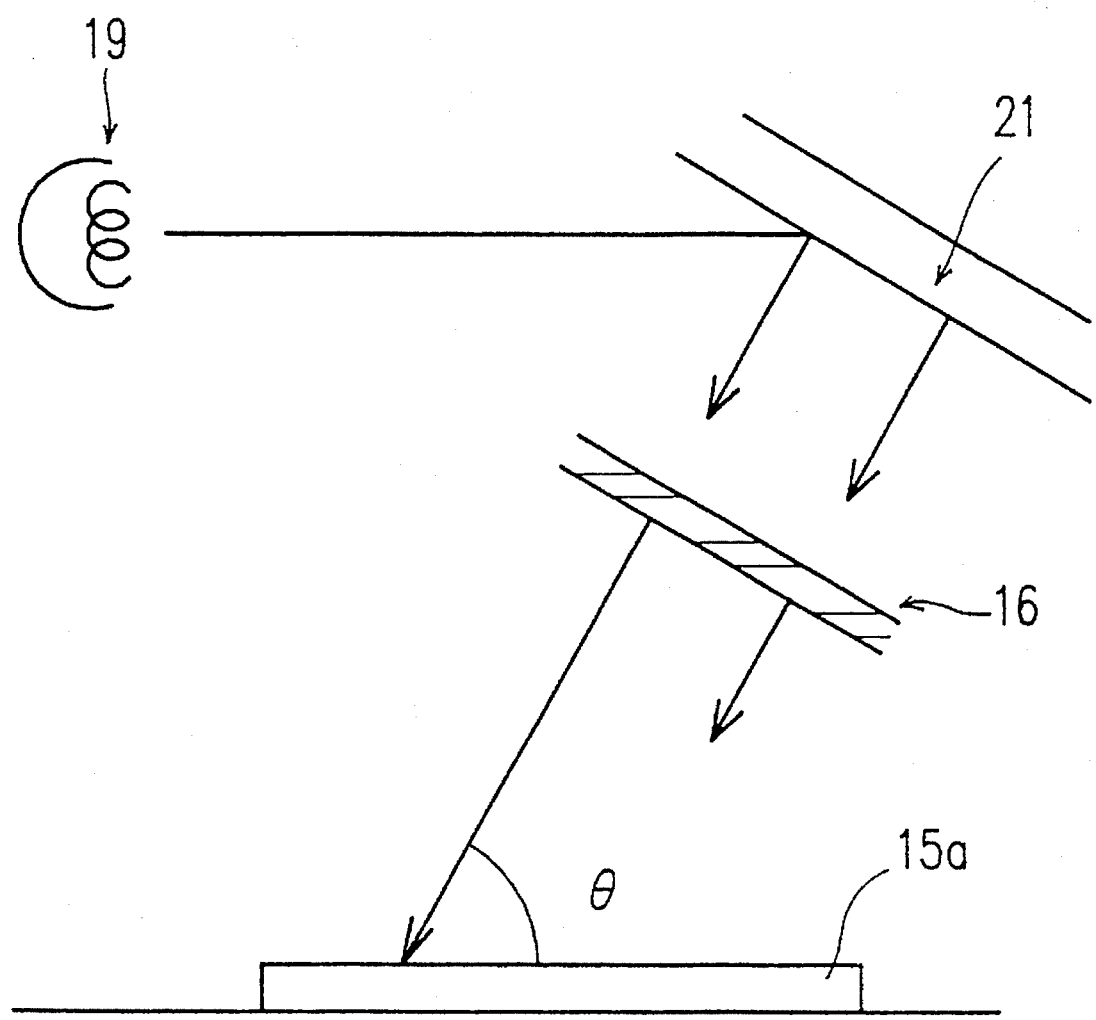
FIG. 5 is a schematic view illustrating the arrangement of an apparatus and a substrate portion, which shows a third method for irradiating light with a light source being inclined during a light irradiation process according to Example 1.

These fabrication apparatuses shown in FIGS. 3 to 5 may include a mechanism for inclining the stage 20 holding the substrate portion 15a or the light source 19. Alternatively, in order to irradiate the alignment film 14a with light at an angle, these fabrication apparatuses may have an optical system for allowing the optical axis to have the arbitrary inclination. In this way, the light source 19 and the polarizing filter 16 having at least one polarization direction in one face are provided. The upper and the lower substrate portions 15a and 15b are irradiated with the polarized light 18 so as to align the liquid crystal molecules. Thereafter, the upper and the lower substrate portions 15a and 15b are attached to each other so that the alignment direction is 90°, and a liquid crystal material is injected into the gap of the two attached substrates, thereby completing the liquid crystal display device. The liquid crystal layer of thus obtained liquid crystal display device has good orientation states.

Although an active-matrix type, TN-mode, transmissive liquid crystal display is described in the above example, the present invention is not limited to the liquid crystal display device. If the invention is applied to a reflective liquid crystal display, the substrate 11a and the electrode 13a may not be transparent. In addition, MIM(metal-insulator-metal) elements may be used instead of the TFTs. Moreover, the present invention is applicable to a simple matrix type liquid crystal display device which does not include an active element.

The display mode of the liquid crystal display device of the present invention is not limited to a TN mode. The present invention is also applicable to an STN (super-twisted nematic) mode and the like. The alignment treatment with the light irradiation according to the present invention may be performed for one of the two alignment films which are contact with the liquid crystal layer. Although the polyimide film is used as the alignment film 14a, an alignment film consisting of other organic polymer material containing polyvinylalcohol, polyamide, polystyrene and the like as a main component may also be used.

Example 2

FIG. 6A is a cross-sectional view schematically showing a light irradiation process in Example 2 of the present invention. In FIG. 6A, electrodes 33 are formed on a substrate 31. An alignment film material is applied onto the substrate 31 and is baked. As a result, an alignment film 34 is formed so as to cover the electrodes 33, thereby completing a substrate portion 35. A slit plate 36 having a plurality of slits 36a (opening portions) is provided above the alignment film 34 of the substrate portion 35. The alignment film 34 is irradiated with the light through the slits 36a. It is preferable that the irradiated light beam is a collimated light beam. As the slit plate 36, for example, a normal photomask and the like is used. FIG. 6B is a plan view showing the slit plate 36. The slit plate 36, including the slits 36a, which has a width (x) of 5 micron and a pitch (y) of 10 micron each, is provided so as to cover the entire display region.

The alignment film 34 is irradiated with the light through the slit 36a, thereby breaking the molecular bonds on the alignment film 34 in the irradiated region. Thus, the polymer molecules of the alignment film 34 have directionality parallel to the extending direction E of the slits 36a. The power of the alignment film for regulating the alignment of the liquid crystals becomes stronger as the width and the pitch of the slit 36a decrease. As the width and the pitch are reduced, the optical interference phenomenon occurs. However, while the molecular bonds are increasingly broken in the region which is irradiated with strong light, the molecular bonds are not broken in the region which is irradiated with weak light. Therefore, the optical interference phenomenon does not inhibit the objective of the present invention.

Therefore, a fabrication apparatus is provided with the light source and at least one slit formed so as to have at least one direction in the face. Moreover, the fabrication apparatus has the structure for irradiating an alignment film with light through a photomask having the slits 36a. As a result, the substrate portion 35 having good alignment function may be fabricated.

In Example 2, the alignment film is irradiated with light through the slits 36a having a predetermined width and a predetermined pitch. However, as shown in FIG. 7, the similar effects can be obtained by irradiating the alignment film with light while moving a slit plate 37 having a slit 37a (for example, having a width of 5 microns) at predetermined intervals (for example, 10 microns). In this case, the regions, in which molecule bonds are broken by light irradiation, can be formed in a striped manner, thereby providing the alignment film 34 with the directionality as mentioned above. The amount of light required for these methods is 1 J/cm² or more.

It is possible to provide the directionality to the alignment film 34 by irradiating it with light while continuously moving the slit 37a. In this case, the bonds are not broken by the energy of light. The directionality is provided to alignment film 34 by utilizing the principle that new bonds are generated between atoms in the irradiated region and the adjacent non-irradiated region, when excited electrons in the irradiated region relax to a ground state. With this method, the directionality given to the alignment film 34 is in a direction perpendicular to the extending direction of slit 37a (parallel to the moving direction S in FIG. 7). By any of the above-mentioned methods, a liquid crystal display device including a liquid crystal layer having good orientation states can be obtained as in Example 1.

Although the slit 36a has a width of 5 microns and a pitch of 10 microns in Example 2, the light irradiation may be conducted through the slits provided in a striped manner at intervals of several microns or less. The light irradiation may be conducted while moving the slits provided at a larger pitch at fixed intervals.

Furthermore, although the slit plate 36 or 37 is used in Example 2, a diffraction grating may be used instead of the slit plate 36 or 37.

Example 3

As in Examples 1 and 2, an alignment film is formed on the substrate in Example 3. Instead of irradiating light through the slit, the alignment film is irradiated with a laser beam while scanning the laser beam. With this process, the similar alignment treatment as in Example 2 may be performed. The polymer molecular bonds of the alignment film are broken only in the region which is irradiated with the laser beam, whereby the directionality is provided to the alignment film. A liquid crystal display device having good orientation states can be obtained as in Example 1 with a fabrication apparatus having a device for scanning the laser beam in an arbitrary direction.

Example 4

Figure 8:
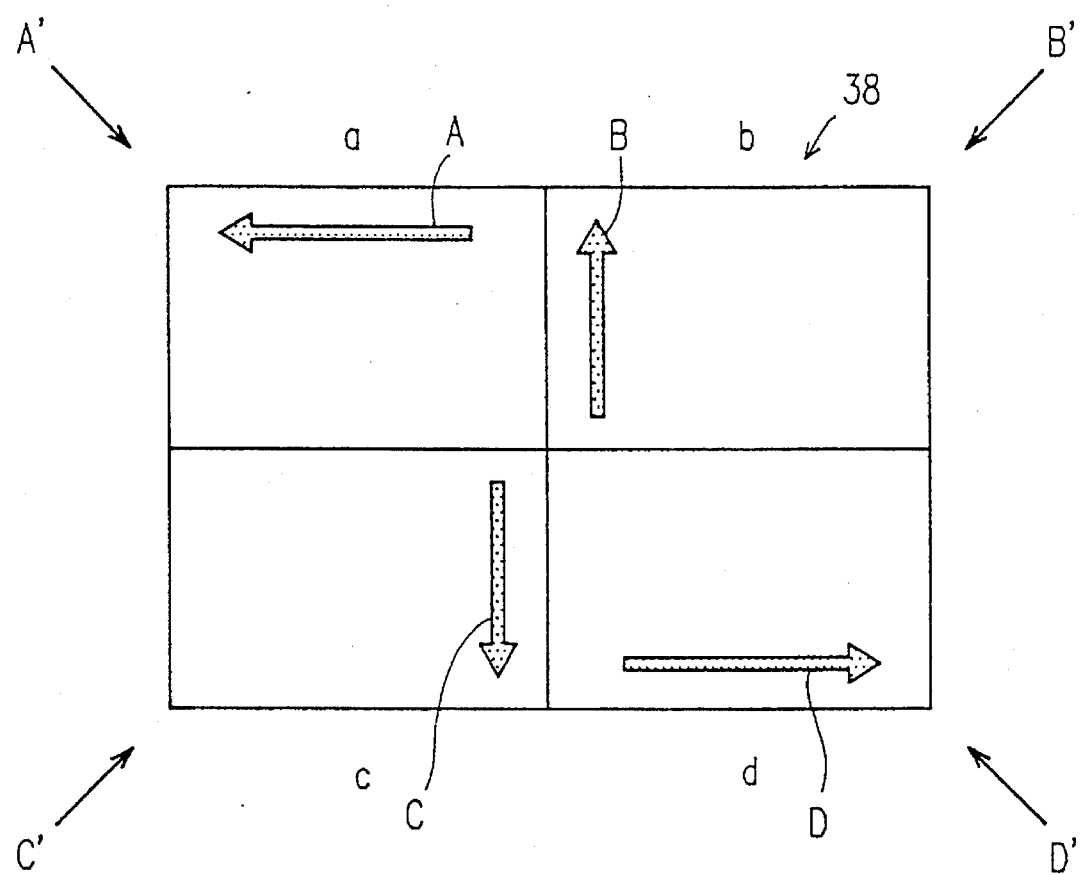
FIG. 8 shows polarization directions of light irradiated to each pixel in a LCD according to Example 4 of the present invention.

FIG. 8 shows polarization directions of divided regions in a LCD according to Example 4 of the present invention. In FIG. 8, an alignment film material is applied onto the substrate. Each pixel 38 is divided into four regions, that is, a to d regions. Then, the divided regions are irradiated with the polarized light before polymer molecular chains are formed. The region a is irradiated with the light through the polarizing filter having a polarization direction A. Thereafter, the regions b, c and d are irradiated with the light having a polarizing direction B, the light having a polarization direction C, and the light having a polarization direction D, respectively.

Figure 9:
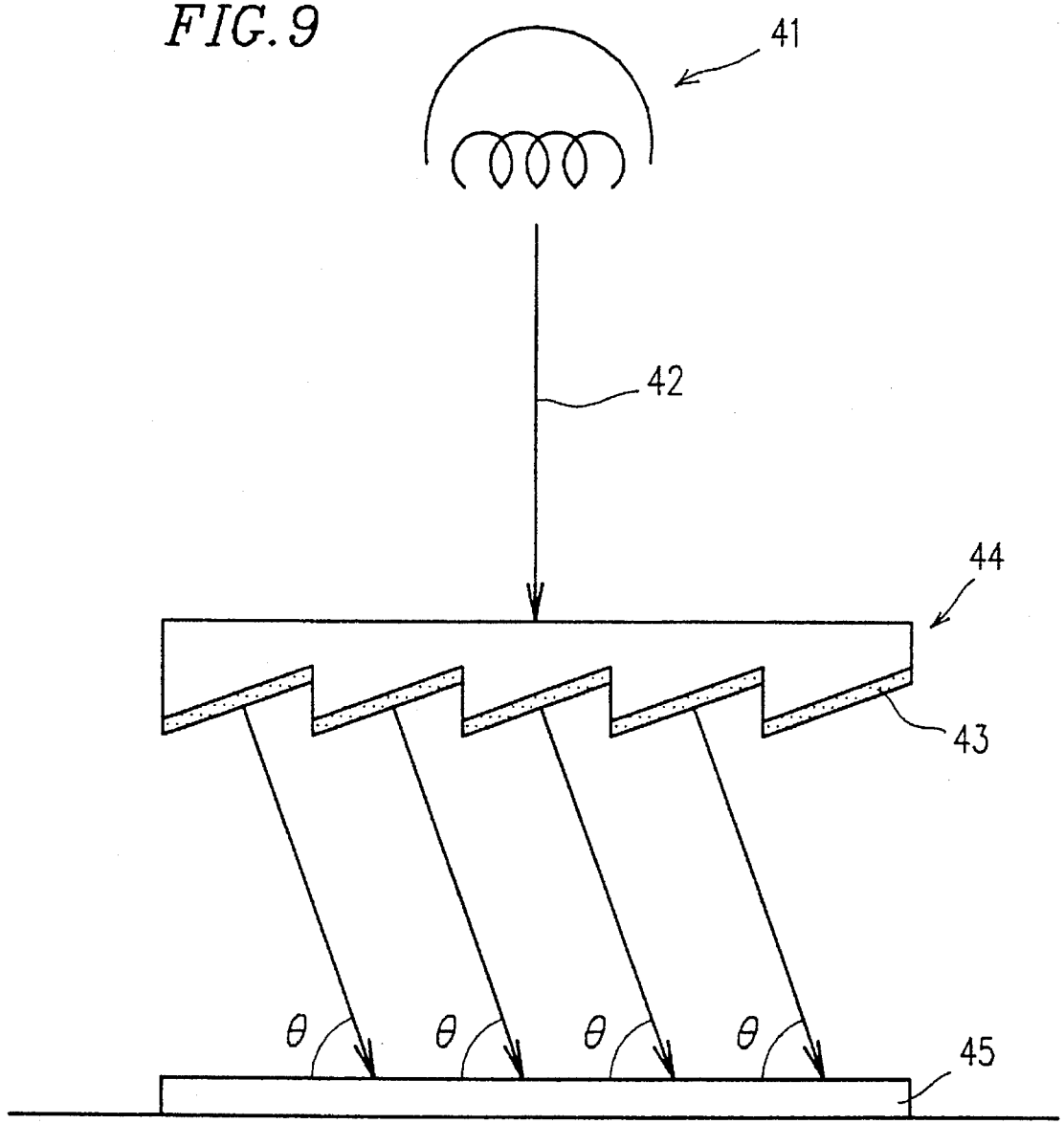
FIG. 9 is a cross-sectional view showing an apparatus and a substrate portion, which schematically illustrates a light irradiation process in Example 4 of the present invention.
Figure 10:
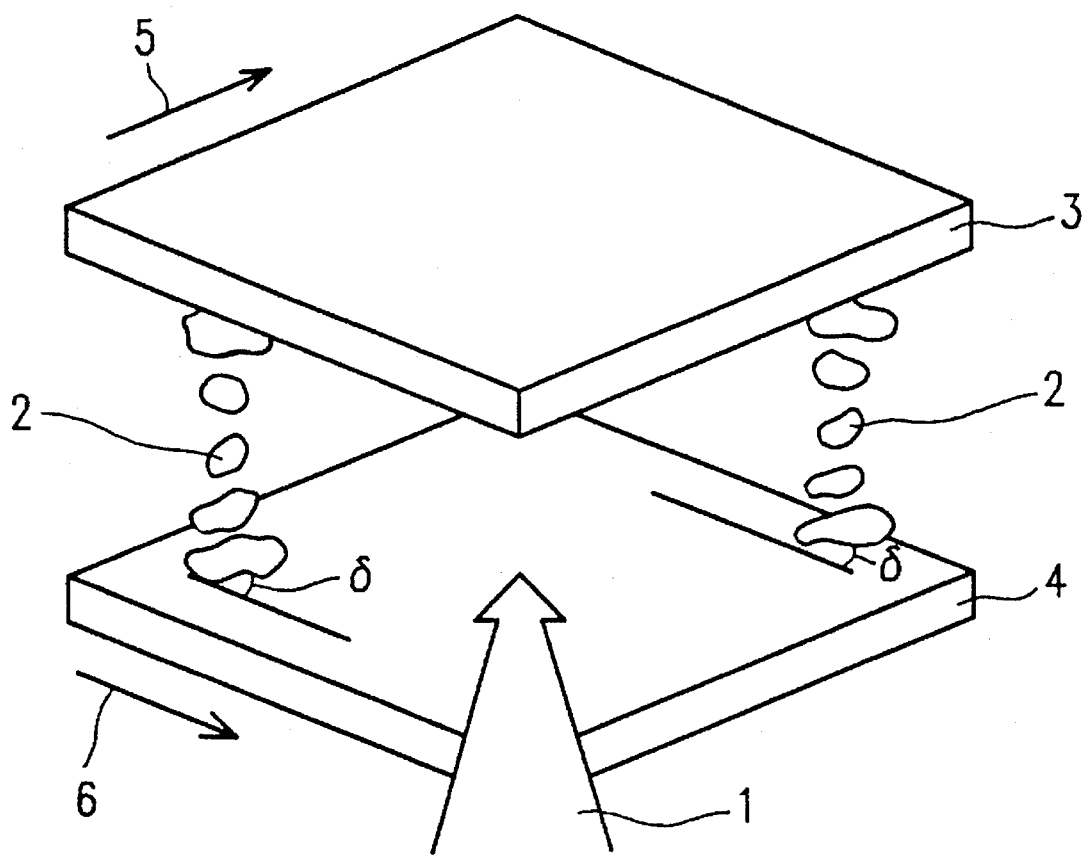
FIG. 10 is a perspective view illustrating the viewing angle characteristics in a conventional liquid crystal display device.
Figure 11:
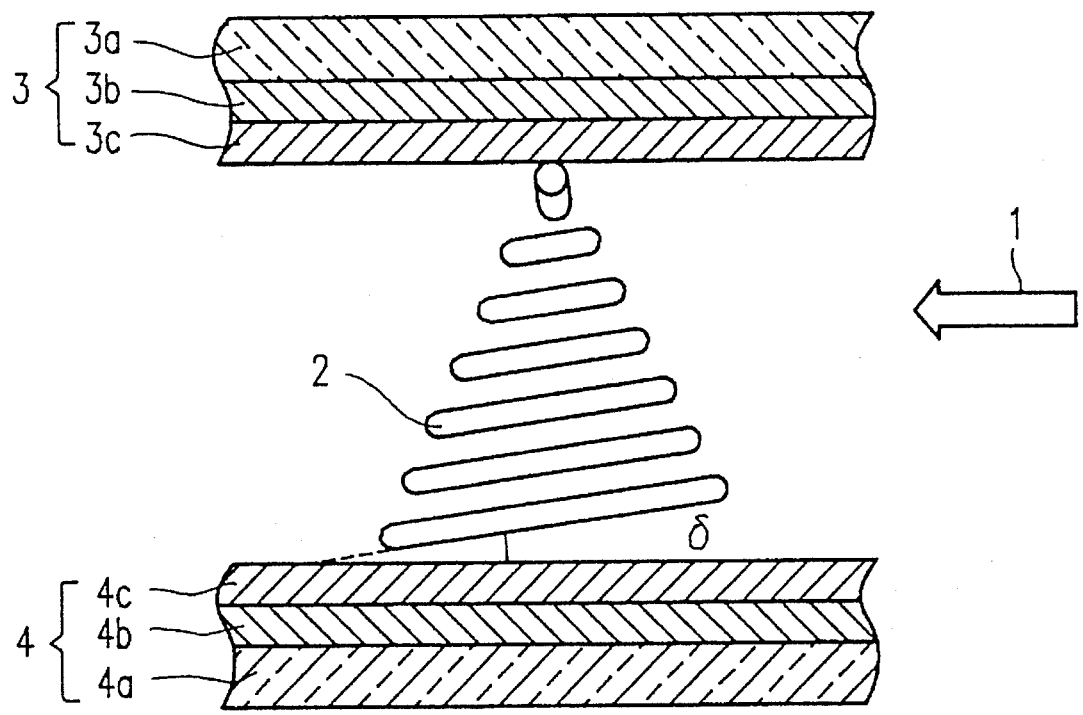
FIG. 11 is a cross-sectional view illustrating the viewing angle characteristics in a conventional liquid crystal display device.
Figure 12:
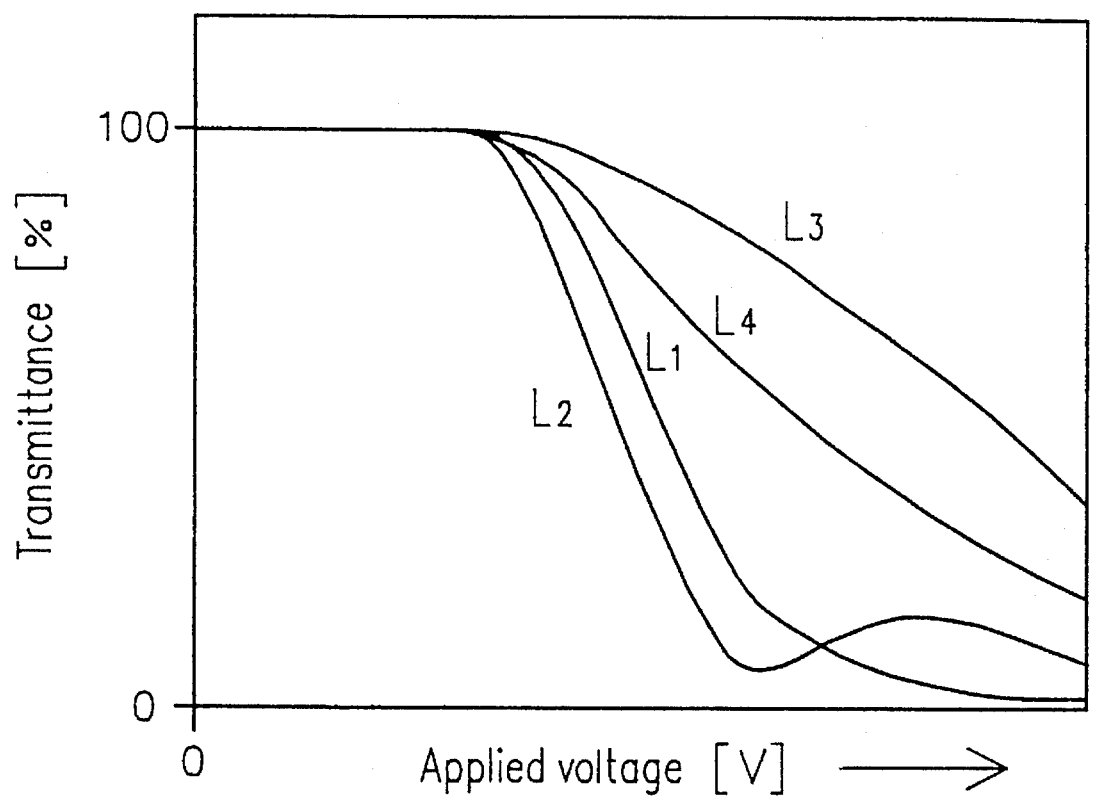
FIG. 12 is a graph showing applied voltage-transmittance characteristics in a liquid crystal display device.
Figure 13A:
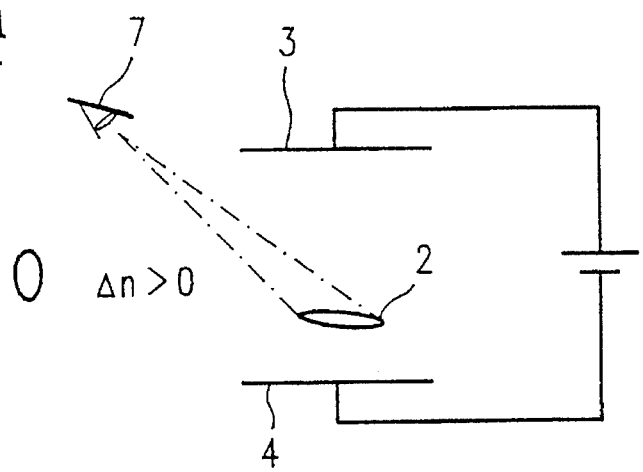
FIGS. 13A to 13C are cross-sectional views illustrating the inversion phenomenon in a conventional liquid crystal display device.
Figure 13B:
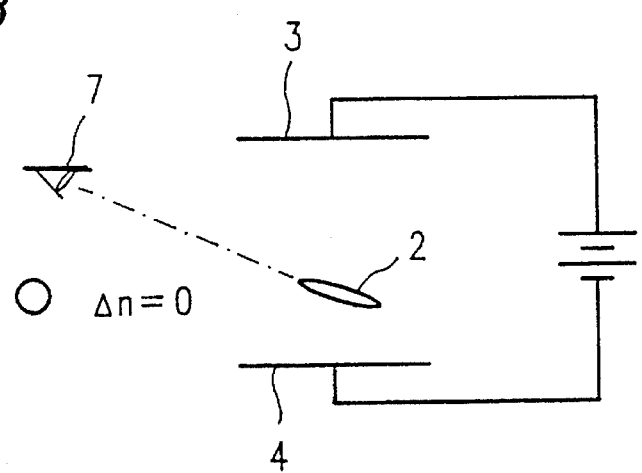
Figure 13C:
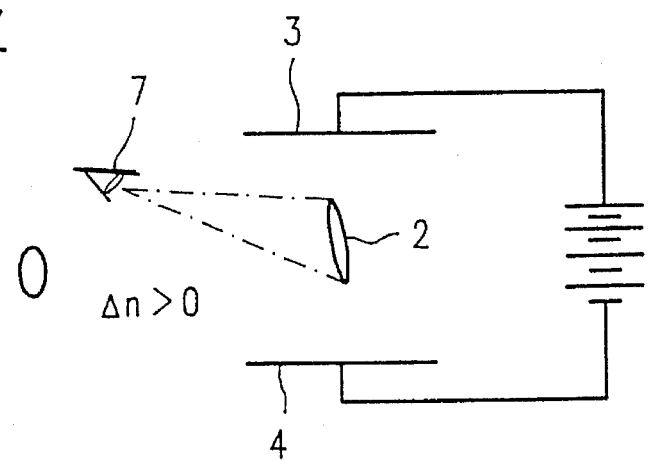

In FIG. 9, the alignment film of the substrate portion 45 is irradiated through a lens 44 with light 42 from a light source 41. The lens 44 has polarizing filters 43 on the respective inclined lower faces so that the optical axis of the respective light is inclined with a predetermined angle θ. The electrons, which absorb the energy of the polarized light, are excited enough to generate molecular bonds, thereby forming polymer molecular chains having a directionality parallel to the polarization direction. The liquid crystal molecules are aligned along the polymer molecular chains, and are tilted in the optical axis direction. The amount of light is 1 J/cm² or more for each region.

The regions a, b, c and d have viewing directions A', B', C' and D', respectively. The viewing angle characteristic of the whole display is a mixture of the viewing angle characteristics in four directions. Therefore, the inversion phenomenon does not occur and the contrast is not lowered. Accordingly, good viewing angle characteristics may be obtained. The viewing directions may be set in other directions by setting the alignment directions of the other alignment films and/or the twist direction of the liquid crystal molecules between the two alignment films.

Such a liquid crystal display device may be fabricated by an apparatus including, for example, a light source 41 such as a mercury-xenon lamp or a low-pressure mercury lamp, a polarizing filter, a stage for holding the substrate, and a mechanism for inclining the light source or the stage or an optical system for inclining the optical axis.

The alignment film is divided into a plurality of minute regions each of which includes the polymer molecules unidirectionally aligned. In the different regions, the aligning directions of the polymer molecules are different from each other. Such an alignment film is obtained by any one of the following methods: irradiating the respective minute regions of the alignment film with the polarized light beams having different polarization directions; irradiating the regions with light through at least one slit arranged in a different manner for each of the respective regions; and scanning the laser beam in different directions for the respective regions.

In this way, a liquid crystal display device having improved viewing angle characteristics may be obtained by dividing one liquid crystal cell or each pixel into a plurality of minute regions and performing the non-contact aligning treatment, in which nothing is brought in direct contact with the alignment film, for each minute region.

In this example, each pixel is divided to form the minor regions having different viewing directions. Instead, each pixel may have a viewing direction different from another pixel. Alternatively, a minor region may correspond to a pixel, or a larger region including plurality of the pixels. In addition, the present invention may be adopted to any type of substrate included in the conventionally used liquid crystal display device.

The techniques for aligning the liquid crystal molecules using light are proposed in, for example, Japanese Laid-Open Patent Publication Nos. 4-350822, 5-134247, 5-34699 and Japanese Laid-Open Patent Publication No. 5-53513 discloses a method for aligning the liquid crystal molecules using a laser beam. However, the constitutions and the objectives thereof are completely different from those of the present invention. For example, in Japanese Laid-Open Patent Publication No. 4-350822, which discloses a technique of non-contact aligning treatment, the light irradiation is conducted for a liquid crystal cell interposing the liquid crystal material between upper and lower substrates. When the liquid crystal material is irradiated with light, there arises a problem that a voltage holding capability is lowered due to the degradation of the liquid crystal material. On the other hand, according to the present invention, since the alignment film is irradiated with light before the liquid crystal material is interposed between the substrates, the liquid crystal material is never degraded. The technique disclosed in Japanese Laid-Open Patent Publication No. 4-350822 is for uniformly aligning the liquid crystal molecules with the liquid crystal molecules fixed to the alignment film by irradiating the liquid crystal molecules and the alignment layer under the application of the electric field or the magnetic field. On the other hand, the sufficient effect is obtained by the irradiation of the polarized light in the present invention. Therefore, the constitutions and the objectives of the invention disclosed in Japanese Laid-Open Patent Publication No. 4-350822 are completely different from those of the present invention.

There are other methods for uniformly aligning the liquid crystal molecules: for example, a method for a non-contact alignment treatment disclosed in Japanese Laid-Open Patent Publication No. 5-134247, a method for preventing the orientational defect or the defect due to a static electricity in Japanese Laid-Open Patent Publication No. 5-34699; and a method using the heating reaction disclosed in Japanese Laid-Open Patent Publication No. 5-53513. However, the contents and the objectives thereof are completely different from those of the present invention.

As described above, according to the present invention, the problems such as complication of the fabrication process and the contamination and the defect of the alignment films are solved. Moreover, the viewing angle characteristics can be improved by aligning the liquid crystal molecules in a plurality of arbitrary directions. Thus, an LCD of high quality can be provided at low cost with a high rate of acceptable products.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for producing a liquid crystal display device including:
    a pair of substrates;
    a pair of electrodes formed on the pair of substrates;
    a pair of alignment films formed on the pair of electrodes; and
    a liquid crystal layer sandwiched between the pair of alignment films, comprising the step of:
        irradiating at least one of the pair of alignment films with a light beam to cause a new bond formation reaction or bond cleavage reaction of molecular chains of at least one of the pair of the alignment films such that the at least one alignment film has a property to align liquid crystal molecules of the liquid crystal layer with a pretilt angle, wherein the at least one of the pair of alignment films is irradiated with a collimated light beam in a direction inclined with respect to a normal to the at least one of the pair of alignment films, thereby controlling the pretilt angle by an incidence angle between the collimated light beam and the at least one of the pair of alignment films.

2. A method for producing a liquid crystal display device according to claim 1, wherein the light beam with which the at least one of the pair of the alignment film is irradiated is least one of a polarized light beam, a light beam passing through at least one slit, and a unidirectionally scanning laser light beam.

3. A method for producing a liquid crystal display device according to claim 1, wherein the light beam with which the at least one of the pair of the alignment film is irradiated is at least one of a ultra-violet ray, a visible ray and an infrared ray.

4. A liquid crystal display device comprising: a pair of substrates;
    a pair of electrodes formed on the pair of substrates;
    a pair of alignment films formed on the pair of electrodes;
    a liquid crystal layer sandwiched between the pair of alignment films,
    wherein a plurality of regions of at least one of the alignment films have a property of aligning liquid crystal molecules of the liquid crystal layer with a pretilt angle, the property being provided by a new bond formation reaction or bond cleavage reaction of molecular chains caused by irradiating the at least one alignment film with a light beam, the liquid crystal layer having a plurality of regions in which liquid crystal molecules of the liquid crystal layer align in a direction, and where the liquid crystal molecules in each of the plurality of regions align in a different direction, and
    wherein each of the plurality of the regions of the at least one alignment film is treated such that the liquid crystal molecules align with a pretilt angle, by irradiation with at least one of a polarized light beam having a different polarization direction for each of the plurality of the regions, a light beam passing through at least one slit arranged in a different direction for each of the plurality of the regions, and a unidirectionally scanning laser beam in a different direction for each of the plurality of the regions.

5. A method for producing a liquid crystal display device including:
    a pair of substrates;
    a pair of electrodes formed on the pair of substrates;
    a pair of alignment films formed on the pair of electrodes;
    a liquid crystal layer sandwiched between the pair of alignment films, comprising a step of:
        irradiating a plurality of regions of at least one of the pair of alignment films with a light beam such that the liquid crystal layer has a plurality of regions and liquid crystal molecules in each of the regions align in a different direction, and
        wherein the light beam with which the at least one of the pair of the alignment films is irradiated with at least one of a polarized light beam having a different polarization direction for each of the plurality of the regions, a light beam passing through at least one slit arranged in a different direction for each of the plurality of the regions, and a unidirectionally scanning laser beam in a different direction for each of the plurality of the regions.

6. A method for producing a liquid crystal display device according to claim 5, wherein the at least one of the pair of the alignment film is irradiated with a collimated light beam in a direction inclined with respect to a normal to the at least one of the pair of the alignment film.

7. A method for producing a liquid crystal display device according to claim 5, wherein the light beam with which the at least one of the pair of the alignment film is irradiated is at least one of a ultra-violet ray, a visible ray and an infrared ray.

8. A method for producing a liquid crystal display device including:
    a pair of substrates;
    a pair of electrodes formed on the pair of substrates;
    a pair of alignment films formed on the pair of electrodes; and a liquid crystal layer sandwiched between the pair of alignment films, comprising a step of:

irradiating at least one of the pair of alignment films with a light beam to cause bond cleavage reaction of molecular chains of the at least one of the pair of alignment films such that the at least one alignment film has a property to align liquid crystal molecules of the liquid crystal layer with a pretilt angle.

9. A method for producing a liquid crystal display device according to claim 8, wherein the light beam with which the at least one of the pair of alignment films is irradiated is selected from the group including a polarized light beam, a light beam passing through at least one slit, and a unidirectionally scanning lesser light beam.

10. A method for producing a liquid crystal display device according to claim 8, wherein the at least one of the pair of alignment films is irradiated with a collimated light beam in a direction inclined with respect to a normal to the at least one of the pair of alignment films.

11. A method for producing a liquid crystal display device according to claim 8, wherein the light beam with which the at least one of the pair of alignment films is irradiated is selected from the group including an ultraviolet ray, a visible ray and an infrared ray.

12. A method for producing a liquid crystal display device according to claim 8, wherein the at least one of the pair of alignment films is irradiated with a collimated light beam in a direction inclined with respect to a normal to the at least one of the pair of alignment films, thereby controlling the pretilt angle by an incidence angle between the collimated light beam and the at least one of the pair of alignment films.

* * * * *